(12) United States Patent
Roberts et al.

(10) Patent No.: US 8,070,946 B2
(45) Date of Patent: Dec. 6, 2011

(54) UNDERDRAIN FOR A FILTER SYSTEM FOR FILTERING WATER OR WASTEWATER AND A METHOD OF WASHING THE FILTER SYSTEM

(75) Inventors: R. Lee Roberts, Chadds Ford, PA (US); Mark Kevin Addison, Bear, DE (US)

(73) Assignee: RG Delaware, Inc., Wilmington, DE (US)

( * ) Notice: Subject to any disclaimer, the term of this patent is extended or adjusted under 35 U.S.C. 154(b) by 733 days.

(21) Appl. No.: 11/898,670

(22) Filed: Sep. 14, 2007

(65) Prior Publication Data
US 2009/0071914 A1 Mar. 19, 2009

(51) Int. Cl.
*B01D 24/46* (2006.01)
(52) U.S. Cl. .................. 210/274; 210/279; 210/293
(58) Field of Classification Search .......... 210/274, 210/279, 291, 793, 794, 795, 293
See application file for complete search history.

(56) References Cited

U.S. PATENT DOCUMENTS

| | | | |
|---|---|---|---|
| 4,214,992 A * | 7/1980 | Sasano et al. ............... | 210/274 |
| 4,619,765 A | 10/1986 | Roberts | |
| 5,019,259 A | 5/1991 | Hambley | |
| 5,068,034 A | 11/1991 | Walter | |
| 5,108,627 A | 4/1992 | Berkebile et al. | |
| 5,149,427 A | 9/1992 | Brown | |
| 5,269,920 A | 12/1993 | Brown et al. | |
| 5,296,138 A * | 3/1994 | Walter .................... | 210/274 |

(Continued)

OTHER PUBLICATIONS

WO 97/40907, Nov. 6, 1997, Savage (International Application published in English).

(Continued)

*Primary Examiner* — Matthew Savage
(74) *Attorney, Agent, or Firm* — Merek, Blackmon & Voorhees, LLC (57) ABSTRACT

An apparatus for filtering water and/or wastewater including at least one underdrain lateral. The underdrain lateral is configured to receive a liquid during a filtration cycle and directs a washing fluid through a filter bed of one or more layers of filter media during a washing cycle. The filter can take any form including but not limited to an upflow clarifier, an upflow filter, a downflow clarifier, a downflow filter and a bi-flow filter. The filter media may be supported by one or more layers of gravel. Alternatively, a porous plate can be attached to the underdrain lateral in place of the gravel layers. The washing cycle can be a liquid only wash, a gas only wash, a combined liquid and gas wash or a combination of any of the aforementioned wash cycles. Preferably, the underdrain lateral includes a primary gas chamber and a secondary gas chamber where the secondary gas chamber serves to equalize pressure differences that may occur during the initial distribution due to velocity head changes and friction effects. Preferably, the underdrain lateral includes a plurality of chambers directing a washing fluid into the filter bed during a washing cycle where at least one of the plurality of chambers directs a liquid and a gas simultaneously into the filter bed and at least one other chamber of the plurality of chamber directs only one of a liquid and a gas into the filter bed at the same time as that the combination of liquid and gas is directed into the filter bed. Preferably, the height of evacuation openings formed in at least one wall common to a gas wash chamber and at least one adjacent chamber are varied to compensate for velocity head or friction loss.

18 Claims, 4 Drawing Sheets

U.S. PATENT DOCUMENTS

| | | |
|---|---|---|
| 5,328,608 A | 7/1994 | Bergmann et al. |
| 5,462,664 A | 10/1995 | Neuspiel |
| 5,489,388 A | 2/1996 | Brown et al. |
| 5,639,384 A | 6/1997 | Brown et al. |
| 5,865,999 A | 2/1999 | Shea et al. |
| 6,325,931 B1 | 12/2001 | Roberts et al. |
| 6,569,327 B2 | 5/2003 | Roberts et al. |
| 6,740,237 B1 * | 5/2004 | Roberts et al. ............ 210/275 |

OTHER PUBLICATIONS

Infinity Continuous Lateral Underdrain, 1999, Roberts Water Technologies, Inc., pp. 1 to 4.

* cited by examiner

UNDERDRAIN FOR A FILTER SYSTEM FOR FILTERING WATER OR WASTEWATER AND A METHOD OF WASHING THE FILTER SYSTEM

FIELD OF THE INVENTION

The present invention is directed to water and/or wastewater filter systems for filtering impurities from a liquid. More particularly, the present invention is directed to an underdrain for a filter system and a method of washing a filter system using the underdrain.

BACKGROUND OF THE INVENTION

Various filter systems have been developed to filter water and wastewater. Typical filter systems include but are not limited to upflow filters, upflow clarifiers, a downflow filter, downflow clarifiers, bi-flow filters as well as various combinations of the aforementioned filter systems. The terms upflow filter and upflow clarifier refer to filter systems in which influent to be filtered is directed in an upward path to remove impurities. Conversely, the terms downflow filter and downflow clarifier refers to filter systems in which the influent is directed in a downward path to remove impurities. Bi-flow filters refer to filter systems in which the influent is directed in both a downward path and an upward path to remove impurities. The upflow filters/clarifiers, downflow filters/clarifiers and bi-flow filters include one or more filter beds formed from one or more layers of filter media. The filter media may be supported by one or more layers of gravel. Alternatively, the one or more gravel layers may be replaced with a porous plate or other direct retention systems.

In a combined system, for example, an upflow filter/clarifier followed by a downflow filter, the influent is initially directed upwardly through the upflow filter/clarifier to remove a predetermined percentage of the impurities in the influent and then directed downwardly through the downflow filter to remove the remaining impurities to within an acceptable limit. Where the filter system includes multiple downflow filters connected in series, the influent is directed downwardly through each of the downflow filters one after the other to remove the impurities within an acceptable limit.

Regardless of the type of granular bed filter system and/or the type of the liquid to be filtered, it is common for the filter system to include an underdrain. The underdrain directs and receives fluids during operation of various cycles of the filter system including the filtration cycle (also referred to as a service run) and a washing cycle. The washing cycle may be performed by directing the washing fluid in a path opposite to the path of influent during the filtration cycle or the washing cycle may be performed by directing the washing fluid in the same path as the path of the influent during the filtration cycle. The washing fluids may include influent, pre-filtered water, air or other suitable gas. A key function of the underdrain is to evenly distribute the washing fluid through the filter bed during the washing cycle so that at least a significant amount of the impurities trapped in the filter can be removed. In the event that the underdrain does not evenly distribute the washing fluid through the filter bed, the filter bed will likely not be properly cleaned. At a minimum, this will cause much shorter filtration cycles and more washing cycles. This is undesirable, as the filter system typically cannot operate in the filtration cycle during a washing cycle.

There are many different types of underdrain systems currently marketed for use in water filtration. Some underdrains are used for water only backwash and some are capable of introducing air only, water only, or simultaneous liquid and air.

A common type of underdrain is the "lateral" style. This type of underdrain is typically made of injection molded or extruded plastic or extruded clay. The underdrain blocks are arranged in rows termed "laterals". The laterals are typically spaced on approximately 12 inch centers leaving an approximately 1 inch space between the laterals. There are two common types of combined air/water lateral type underdrains. One type is configured to introduce air and water into a center compartment that directs the air and water through separate internal orifices into two adjacent, outer compartments. The air and water escape only from the two adjacent, outer compartments into the filter bed from combined air/water orifices in the two adjacent, outer compartments. The two adjacent, outer compartments form in essence dual internal laterals that extend generally the length of the single lateral. This type of system has the limitation that the air and water in the shared compartment is always at the same pressure and a distinct air/water interface is formed within this compartment. The water orifices are located at a lower elevation than the air orifices. The air/water interface must be maintained between the air and water orifices or gross maldistribution of air and/or water will result. As the pressure in this compartment increases, the air/water interface is pushed down lower in the underdrain lateral. Thus, the pressure of the air is limited to the height of the underdrain and the distance between the air and water orifices. In practice, this configuration limits the driving force of the air to relatively low pressures. These types of underdrains are very susceptible to maldistribution problems due to uncontrolled air, flow surges, wave action of the air/water interface and require very tight installation tolerances.

The second common type of air/water lateral employs dedicated air only and water only compartments that distribute the air and water thru separate orifices without the intermixing of the air and water within the lateral. This type of system has the limitation that the air and water distribution orifices that disperse their respective fluid into the filter must be located in their respective distribution chambers. In practice, the size of the various distribution chambers force the distribution orifices into distinct sections of the underdrain and limit the minimum distance between orifices. This configuration results in poor distribution across the underdrain lateral.

Both the first and second types of underdrain laterals are incapable of directing a combination of liquid and air from one compartment and only liquid or air from another compartment.

OBJECTS AND SUMMARY OF THE INVENTION

An object of the present invention is to provide a novel and unobvious underdrain and a method of washing a filter system using the novel and unobvious underdrain.

Another object of a preferred embodiment of the present invention is to provide a lateral type underdrain that permits a combined liquid and air wash to be released from one internal chamber while only liquid or air wash is released from another internal chamber of the lateral.

A further object of a preferred embodiment of the present invention is to provide an underdrain lateral that allows for washing fluid distribution across the entire width of the underdrain lateral including the center of the underdrain lateral.

Yet another object of a preferred embodiment of the present invention is to provide an underdrain lateral that can compensate for velocity head or friction loss depending upon the needs of the particular filter system.

Still another object of a preferred embodiment of the present invention is to provide a primary gas chamber and a secondary gas chamber in fluid communication with the primary gas chamber where the primary gas chamber provide gross distribution down the length of the underdrain lateral and the secondary gas chamber serves to equalize pressure differences that may occur during the initial distribution due to velocity head changes and friction effects.

Yet still another object of a preferred embodiment of the present invention is to provide a method of washing filter wherein a combined liquid and gas wash is released from one chamber of an underdrain lateral while a liquid or gas only wash is simultaneously released from another chamber of the same underdrain lateral.

A further object of a preferred embodiment of the present invention is to provide a method of washing a filter that can subject the filter to a gas wash with both pulsating and steady stream flow of gas at the same time.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one preferred embodiment of the present invention is directed to an apparatus for use in a filter system for filtering water or wastewater. The apparatus includes an underdrain lateral having at least a first chamber and a second chamber. The first chamber is configured to simultaneously direct a liquid and a gas into a filter bed during a first washing procedure including simultaneous use of a liquid and gas to clean the filter bed. The second chamber is configured to direct only one of a liquid and a gas into a filter bed during the first washing procedure while the first chamber is simultaneously directing a liquid and a gas into a filter bed during the first washing procedure.

Another preferred embodiment of the present invention is directed to an apparatus for use in a filter system for filtering water or wastewater. The apparatus includes an underdrain lateral having at least a first chamber, a second chamber and a third chamber. The first chamber is a washing gas only chamber as the first chamber receives a washing gas but not a washing liquid from a washing fluid supply source during washing of a filter bed using simultaneous liquid and gas. The second chamber is in fluid communication with the first chamber such that a washing gas introduced into the first chamber passes into the second chamber. The third chamber has at least one opening for permitting a washing liquid and a washing gas to pass from the third chamber into the filter bed. The third chamber further is configured to simultaneously direct a washing liquid and a washing gas into the filter bed during washing of the filter bed using simultaneous liquid and gas.

A further preferred embodiment of the present invention is directed to an apparatus for use in a filter system for filtering water or wastewater. The apparatus includes an underdrain lateral having at least a first chamber and a second chamber. The first chamber is a washing gas only chamber as the first chamber receives a washing gas but not a washing liquid from a washing fluid supply source during a washing procedure of a filter bed using simultaneous liquid and gas. The second chamber is a washing liquid only chamber as the second chamber receives a washing liquid but not a washing gas from a washing fluid supply source during a washing procedure of the filter bed using simultaneous liquid and gas. The first chamber and the second chamber include a common wall. The common wall has a plurality of liquid evacuation openings for permitting any residual liquid in the first chamber remaining from a service run to pass into the second chamber. The plurality of liquid evacuation openings are positioned at different heights along a length of the common wall to compensate for one of velocity head and friction loss.

Still a further preferred embodiment of the present is directed to a method of washing a filter for removing impurities trapped in a filter bed during a service run of the filter. The method includes the steps of: (a) providing an underdrain lateral having at least a first chamber and a second chamber, the first chamber having at least one opening for permitting a liquid and a gas to pass from the first chamber into the filter bed and the second chamber having at least one opening for permitting a fluid to pass from the second chamber into the filter bed; (b) directing a washing liquid and a washing gas from the first chamber into the filter bed; and, (c) directing only a washing gas from the second chamber into the filter bed while a washing gas and a washing liquid are directed from the first chamber into the filter bed.

Still another preferred embodiment of the present invention is directed to an apparatus for use in a filter system for filtering water or wastewater. The apparatus includes an underdrain lateral having three upper chambers and three lower chambers. Two of the three upper chambers are configured to simultaneously direct a liquid and a gas into a filter bed during a first washing procedure including simultaneous use of a liquid and gas to clean the filter bed while the other of the three upper chambers is configured to direct only a washing gas to the filter bed during the first washing procedure. Two of the three lower chambers are washing liquid only chambers as each of these chambers receives a washing liquid but not a washing gas from a fluid supply source during the first washing procedure while the other of the three lower chambers is a washing gas only chamber as this chamber receives a washing gas but not a washing liquid from a washing fluid supply source during the first washing procedure.

Yet a further preferred embodiment of the present invention is directed to an apparatus for use in a filter system for filtering water or wastewater. The apparatus includes an underdrain lateral having at least a first chamber and a second chamber. The first chamber is a washing gas chamber as the first chamber receives a washing gas from a washing fluid supply source during a washing procedure of a filter bed. The first chamber and said second chamber include a common wall. The common wall has a plurality of liquid evacuation openings for permitting residual liquid in the first chamber remaining from a service run to pass into the second chamber. The plurality of liquid evacuation openings are positioned at different heights along a length of said common wall to compensate for one of velocity head and friction loss.

Another preferred embodiment of the present invention is directed to an apparatus for use in a filter system for filtering water or wastewater. The apparatus includes an underdrain lateral having at least a first chamber, a second chamber, a third chamber and a fourth chamber. The first chamber is a washing gas chamber as the first chamber receives a washing gas from a washing fluid supply source during washing of a filter bed. The second chamber is in fluid communication with the first chamber such that a washing gas introduced into the first chamber passes into the second chamber. The third chamber and the fourth chamber are in fluid communication with the second chamber. Each of the third chamber and the fourth chamber has at least one opening for permitting a washing gas to pass from the corresponding chamber into the filter bed during washing of the filter bed.

A further preferred embodiment of the present invention is directed to a method of washing a filter bed for filtering water or wastewater. The method includes the steps of: (a) providing an underdrain lateral having at least a first chamber, a second chamber and a third chamber, the first chamber being a washing gas chamber as the first chamber receives a washing gas from a washing fluid supply source during washing of a filter bed, the second chamber being in fluid communication with the first chamber such that a washing gas introduced into the first chamber passes into the second chamber, the third chamber being in fluid communication with the second chamber; and (b) directing a gas in a pulsating manner into the filter bed from the third chamber while simultaneously directing gas in a steady stream manner into the filter bed from the second chamber.

DETAILED DESCRIPTION OF THE PREFERRED EMBODIMENTS OF THE INVENTION

The preferred forms of the invention will now be described with reference to FIGS. 1-8. The appended claims are not limited to the preferred forms and no term and/or phrase used herein is to be given a meaning other than its ordinary meaning unless it is expressly stated that the term and/or phrase shall have a special meaning. The term filter as used herein is broadly interpreted to include a device in which at least a portion of the impurities in a liquid are removed including but not limited to a clarifier, a polishing filter and/or a contactor.

FIGS. 1-4

Referring to FIGS. 1 to 4, an underdrain lateral A formed in accordance with a preferred embodiment of the present invention is illustrated in one of many possible configurations. The number of underdrain laterals that are used in any given underdrain system will depend on the size of the filter. Preferably, underdrain lateral A is extruded in relatively long lengths to eliminate or reduce joints along the length of the lateral. However, the present invention is not limited to this fashion and a given lateral could comprise multiple underdrain blocks placed in an end-to-end relationship. The underdrain lateral A can be molded or extruded plastic, an extruded clay or any other suitable material.

Referring to FIGS. 1 to 4, underdrain lateral A is extruded as a single piece and includes rails B and C that allow a porous plate to be detachably connected to the underdrain lateral A in the manner described in detail in U.S. Pat. No. 6,325,931, the entire contents of which is herein incorporated by reference. It will be readily appreciated that a porous plate, if used, can be attached to the underdrain lateral A in any suitable manner. The underdrain lateral A preferably includes internal vertical walls 2 and 4 and horizontal wall 6. Walls 2, 4 and 6, divide the interior of the underdrain lateral into three lower chambers 8, 10 and 12 and three upper chambers 14, 16 and 18. Outer, lower chambers 8 and 12 preferably are liquid wash only chambers as these chambers receive only a liquid during a wash cycle utilizing simultaneous liquid and gas. It should be noted that outer chambers 8 and 12 may have a small amount of air or other washing gas present. However, a washing gas is not initially introduced into these chambers from a washing fluid supply source. A washing liquid can be introduced from the supply source into chambers 8 and 12 at various different locations including the end of the lateral A via a flume disposed adjacent the ends of the underdrain laterals forming the underdrain system, through the top deck of the lateral A into chambers 8 and 12 via a sealed conduit or from the bottom of the underdrain lateral A via a flume positioned below and in fluid communication with openings in the outer, lower chambers 8 and 12. The washing liquid can be influent, filtered water or any other suitable liquid.

Figure 2:
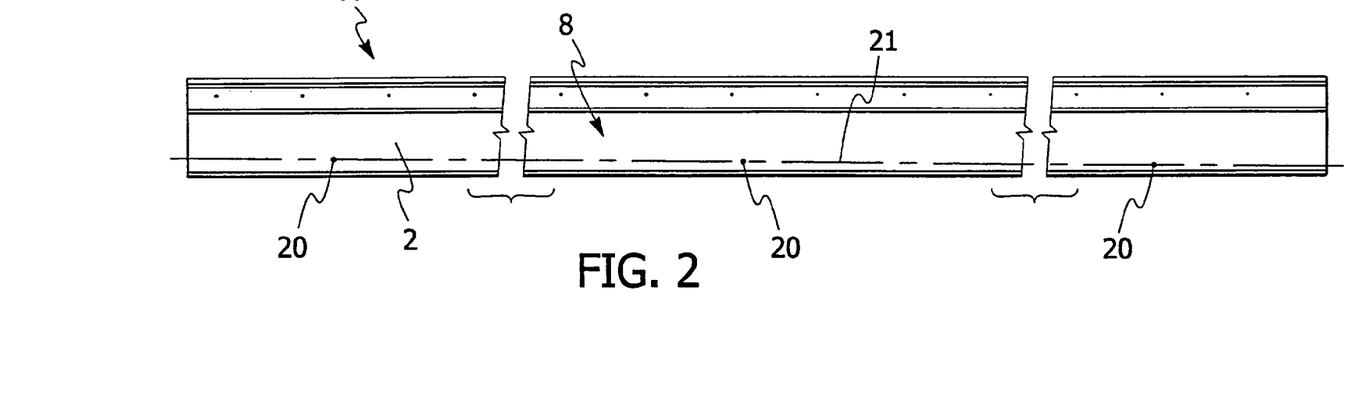
FIG. 2 is a longitudinal section of the underdrain lateral illustrated in FIG. 1.
Figure 3:
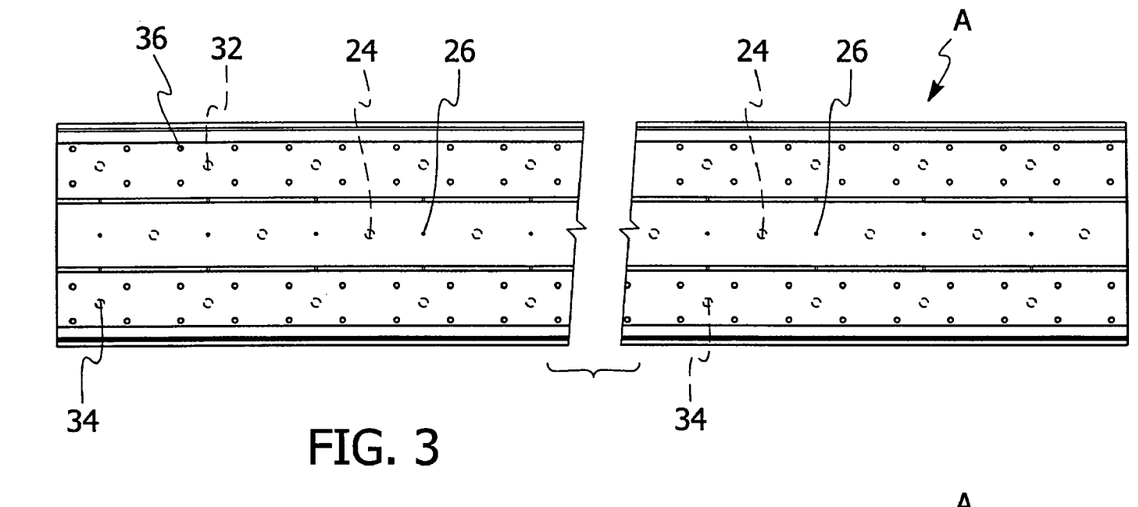
FIG. 3 is a plan view of the underdrain lateral illustrated in FIG. 1.
Figure 4:
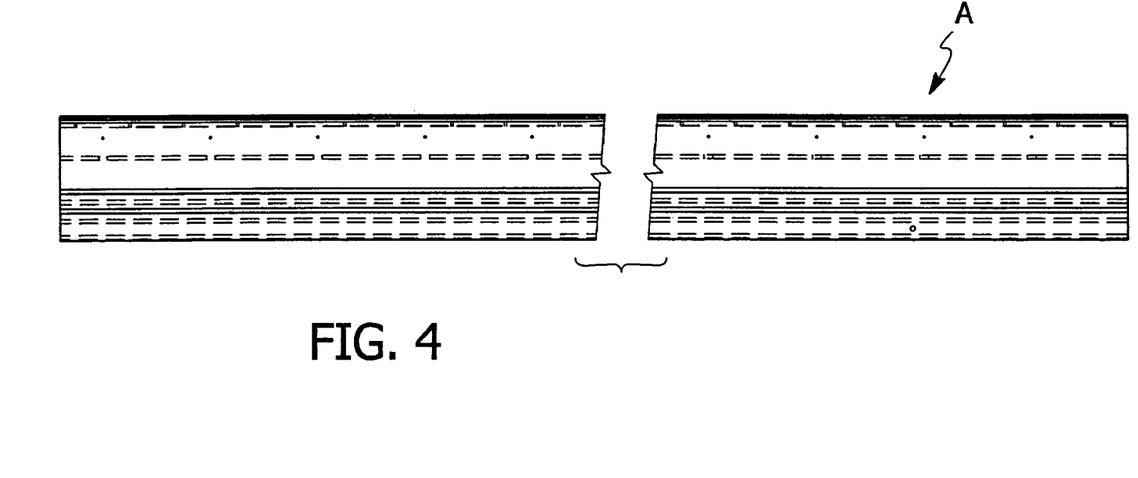
FIG. 4 is an elevational view of the underdrain lateral illustrated in FIG. 1.

Preferably, gas only is introduced into the lower center chamber 10 during a wash cycle utilizing simultaneous liquid and air. The gas can be introduced in same manner as the liquid is introduced into the outer, lower chambers 8 and 12. Air can be used as the washing gas. However, any suitable gas may be used. Evacuation openings 20 and 22 are formed in walls 2 and 4. As seen in FIG. 2, the evacuation openings are spaced along the length of the underdrain lateral and allow any residual water in center chamber 10 remaining from a filtration cycle to pass into chambers 8 and 12. As seen in FIG. 2, the height of the evacuation openings may be varied along the length of the underdrain lateral A to compensate for velocity head or friction loss. Where friction loss is of concern, the evacuation opening at the point air is introduced into chamber 10 is higher than evacuation openings that are further from the point air is introduced into chamber 10. This is depicted by the inclined dashed line 21 in FIG. 2 illustrating three evacuation openings 20 all positioned at different heights on wall 2. In FIG. 2, if friction loss is of concern in the particular environment, air would be introduced at or about the left end of the underdrain lateral A. Conversely if velocity head is of concern in the particular environment, the evacuation opening at the point air is introduced into chamber 10 is lower than evacuation openings that are further from the point air is introduced into chamber 10. In this case, the gas would be introduced at or about the right end of the underdrain lateral A. Positioning the evacuation openings in the above-described manner ensures a uniform distribution of air along the length of underdrain lateral A.

Figure 1:
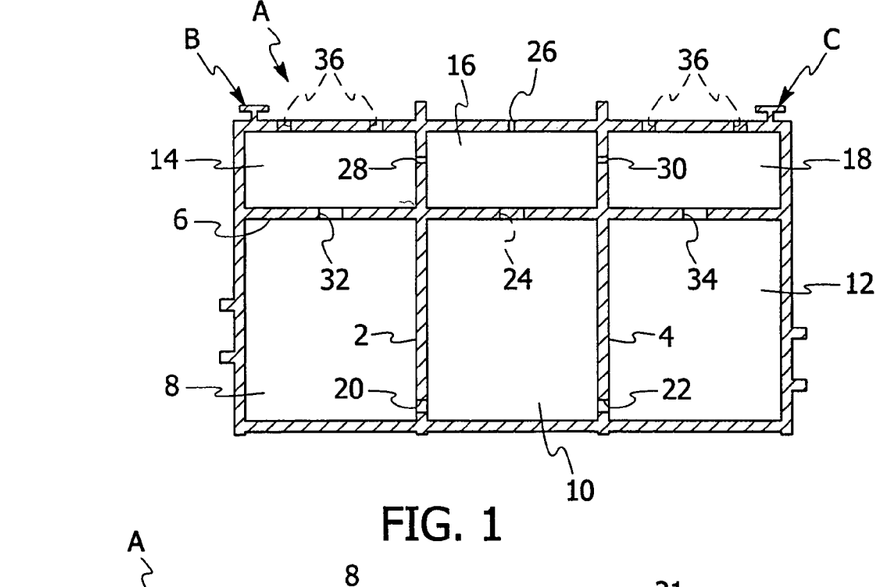
FIG. 1 is a cross-sectional view of an underdrain lateral formed in accordance with a preferred embodiment of the present invention.

Lower, center chamber 10 is in fluid communication with upper, center chamber 16 via a plurality of primary internal air distribution orifices 24 that extend the length of underdrain lateral A. Upper center chamber 16 includes air distribution orifices 26 that extend the length of the underdrain lateral A and permit a gas to pass from chamber 16 into the filter bed to be washed. Openings 28 and 30 are formed in walls 2 and 4, respectively to allow the washing gas to pass from chamber 16 to chambers 14 and 18.

Lower, outer chambers 8 and 10 are in fluid communication with chambers 14 and 18, respectively via primary internal water distribution orifices 32 and 34. Orifices 32 and 34 extend along the length of underdrain lateral A and allow washing fluid in chambers 8 and 12 to pass into chambers 14 and 18, respectively. Upper, outer chambers 14 and 18 include a plurality of openings 36 through which a washing fluid or fluids from chambers 14 and 18 pass into the filter bed to be washed.

During a filtration cycle, all of the six chambers are filled with liquid. Where the filter is a downflow filter, filtered water primarily flows through orifices 26 and 36, thru the orifices 32 and 34 and into a flume or other channel means to remove the effluent from the filter. During a gas only wash cycle, gas such as air is introduced into chamber 10. As pressure builds in chamber 10, residual water will be evacuated from chamber 10 into chambers 8 and 12 via openings 20 and 22. Simultaneously, air will be metered into chamber 16 via orifices 24. As pressure builds in chamber 16, air will be dispersed into the filter through orifice 26. Air will also pass into outer, upper chambers 14 and 18 through orifices 28 and 30 and escape into the filter through orifices 36. During the air only cycle, after a short interval, the filter bed will experience a pulsating gas action from orifices 36 and a steady stream gas action from orifices 26. This pulsating versus steady stream action will enhance filter bed agitation and improve cleaning thereof.

During a simultaneous liquid and gas wash cycle, air is introduced in underdrain lateral A and the filter bed in the same manner as described above. Simultaneously, a washing liquid is introduced into the lower, outer chambers 8 and 12. The washing liquid travels from lower, outer chambers 8 and 12 into the corresponding outer, upper chambers 14 and 18 where it mixes with the washing gas. Combined liquid and gas flow into the filter bed through orifices 36. At the same time, gas only flows into the bed through orifices 26.

During liquid only wash cycle, liquid is introduced into chambers 8 and 12 and distributed as described above. Notably, just liquid will flow through orifices 36.

Figure 5:
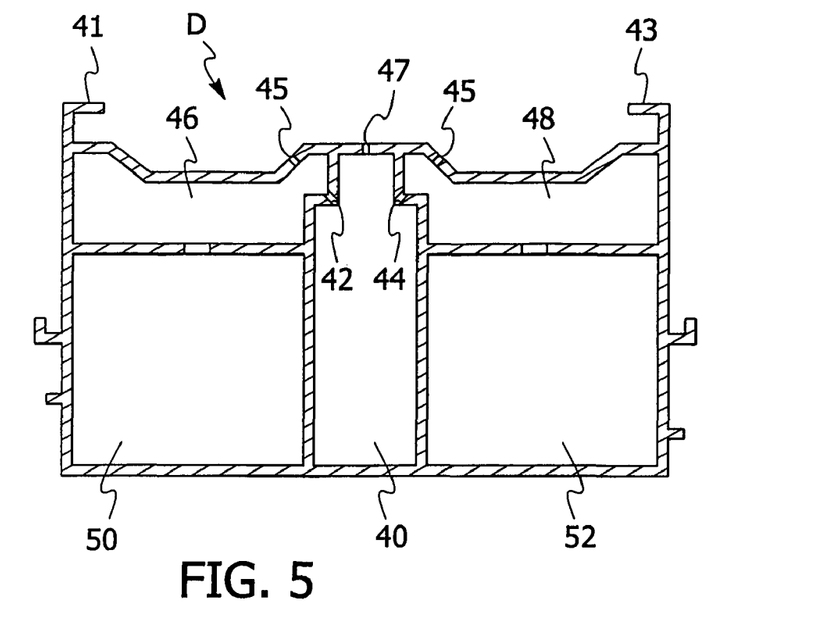
FIG. 5 is a cross-sectional view of an underdrain lateral formed in accordance with another preferred embodiment of the present invention.

FIG. 5

Underdrain lateral D depicted in FIG. 5 is similar to underdrain lateral A and, therefore, only the differences will be described in detail. As opposed to rails B and C, underdrain lateral D includes opposing arms 41 and 43 for receiving a porous plate. Underdrain lateral D further includes a single gas chamber 40 as opposed to two gas chambers employed in underdrain lateral A. Chamber 40 includes evacuation openings (not shown) through which residual water is evacuated from chamber 40. Chamber 40 further includes openings 42 and 44 that extend along the length of the underdrain lateral. Openings 42 and 44 allow the chamber 40 to communicate with outer, upper chambers 46 and 48. Air is introduced into the lateral only through chamber 40 while water is introduced into the lateral only through chambers 50 and 52. The wash cycle (i.e., gas only; liquid only; and combined liquid and gas) are performed in the same manner as underdrain lateral A with the sole exception that gas introduced into chamber 40 passes directly into chambers 46 and 48 without any intermediate chamber. Washing fluid escapes into the filter bed from chambers 46 and 48 through openings 45. Washing fluid escapes into the filter bed from chamber 40 through openings 47.

Figure 6:
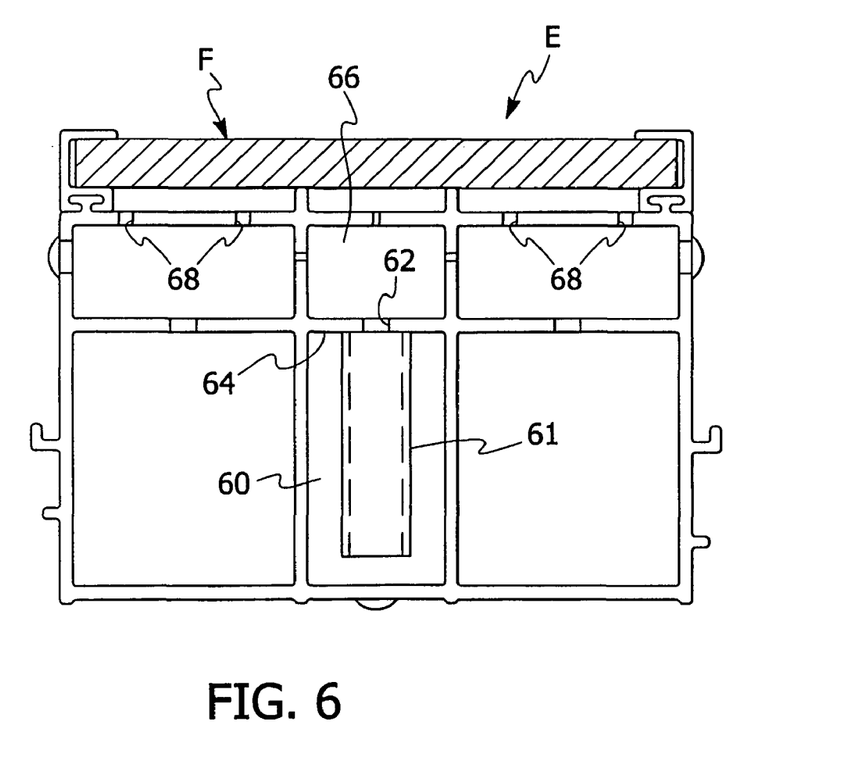
FIG. 6 is cross-sectional view of an underdrain lateral formed in accordance with a further preferred embodiment of the present invention.

FIG. 6

Underdrain lateral E depicted in FIG. 6 is similar to underdrain lateral A and, therefore, only the differences will be described in detail. It is noted that FIG. 6 illustrates a porous plate F detachably secured to underdrain lateral E. As opposed to evacuation openings 20 and 22, a water evacuation tube 61 is positioned in chamber 60 surrounding orifice 62 formed in wall 64. As air is introduced into chamber 60, residual water is forced upward through tube 61 into chamber 66. The bulk of the water then exits the underdrain lateral E through orifices 68.

Figure 7:
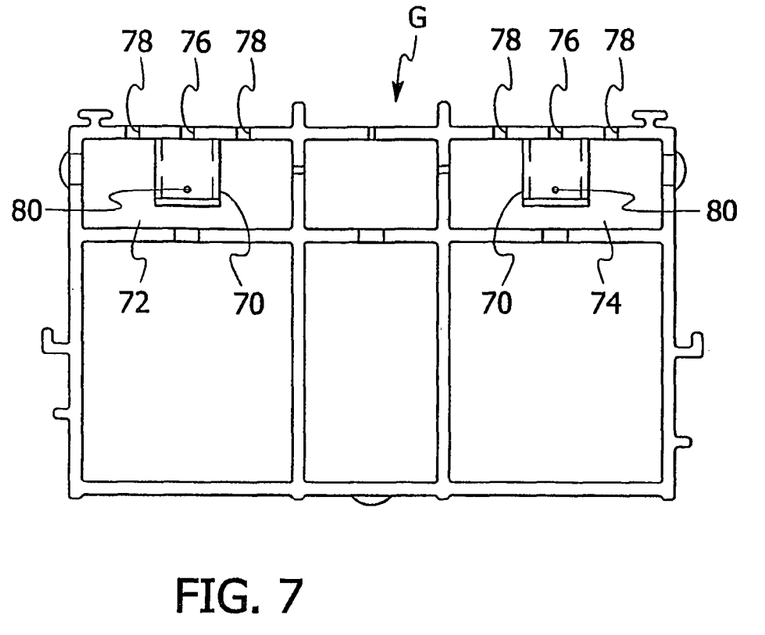
FIG. 7 is cross-sectional view of an underdrain lateral formed in accordance with yet a further preferred embodiment of the present invention.

FIG. 7

Underdrain lateral G depicted in FIG. 7 is similar to underdrain lateral A and, therefore, only the differences will be described in detail. Water recovery tubes 70 are formed in each of chambers 72 and 74 surrounding orifices 76. While liquid and air pass into the filter bed through orifices 78, liquid can return into chambers 72 and 74 through orifices 76 and tubes 70. Each tube 70 includes an orifice 80 that is positioned below the air/water interface to allow the liquid to return into chambers 72 and 74 below the air/water interface.

Figure 8:
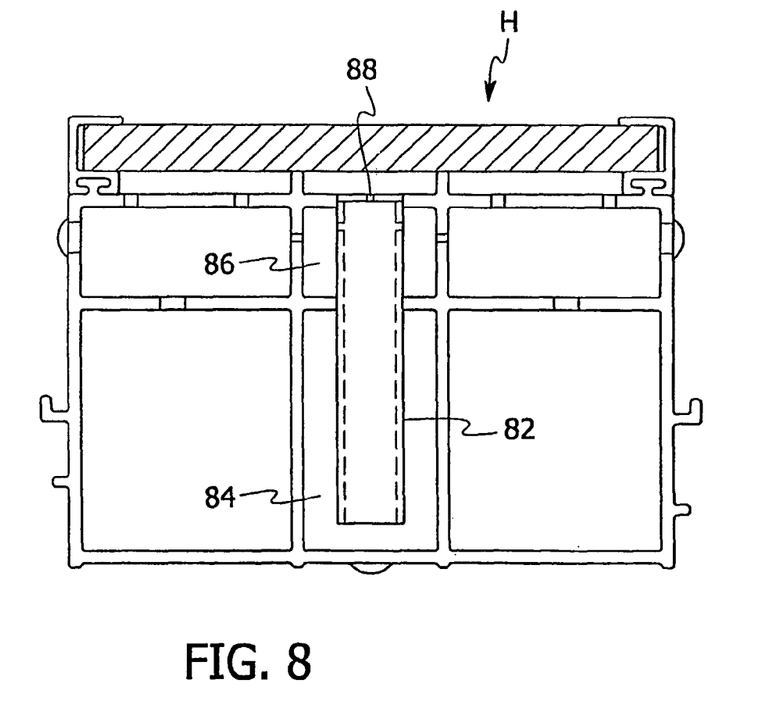
FIG. 8 is cross-sectional view of an underdrain lateral formed in accordance with yet still a further preferred embodiment of the present invention.

FIG. 8

Underdrain lateral H depicted in FIG. 8 is similar to underdrain lateral E and, therefore, only the differences will be described in detail. A water evacuation tube 82 extends from lower gas only wash chamber 84 to secondary gas chamber 86. The water evacuation tube 82 performs the same function as tube 61 with the sole exception that residual water passes from the tube 82 through orifice 88 in the filter bed. FIG. 8 also shows orifices in the sides of the tube to allow the residual water to enter chamber 86.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. An apparatus for use in a filter system for filtering water or wastewater, said apparatus comprising:
   (a) an underdrain lateral, said underdrain lateral having at least a first chamber, a second chamber and a third chamber, said third chamber being disposed below a lowermost portion of at least one of said first chamber and said second chamber, said underdrain lateral further including an inner wall, an orifice being formed in said inner wall to permit a gas to pass from said second chamber into said first chamber, said orifice being disposed between an upper surface and a lower surface of said second chamber, said inner wall having an orientation other than horizontal;
   (b) said first chamber being configured to simultaneously direct a liquid and a gas into a filter bed during a first washing procedure including simultaneous use of a liquid and gas to clean the filter bed; and,
   (c) said second chamber being configured to direct only a gas into a filter bed during the first washing procedure while said first chamber is simultaneously directing a liquid and a gas into a filter bed during the first washing procedure.

2. An apparatus as set forth in claim 1, wherein:
(a) said underdrain lateral includes means for securing a porous plate to said underdrain lateral above said first and second chambers.

3. An apparatus as set forth in claim 2, wherein:
(a) at least a portion of said means for securing is formed as one piece with at least a portion of said first chamber.

4. An apparatus for use in a filter system for filtering water or wastewater, said apparatus comprising:
(a) an underdrain lateral, said underdrain lateral having at least a first chamber and a second chamber, said underdrain lateral further including an inner wall, an orifice being formed in said inner wall to permit a fluid to pass from said second chamber into said first chamber, said orifice being disposed between an upper surface and a lower surface of said second chamber, said inner wall having an orientation other than horizontal;
(b) said first chamber being configured to simultaneously direct a liquid and a gas into a filter bed during a first washing procedure including simultaneous use of a liquid and gas to clean the filter bed; and,
(c) said second chamber being configured to direct only a gas into a filter bed during the first washing procedure while said first chamber is simultaneously directing a liquid and a gas into a filter bed during the first washing procedure;
(d) said underdrain lateral includes three upper chambers and three lower chambers, said first chamber and said second chamber form two of said three upper chambers, a third upper chamber is configured to direct a washing liquid and a washing gas into the filter bed during a first washing procedure including simultaneous use of a liquid and gas to clean the filter bed.

5. An apparatus as set forth in claim 4, wherein:
(a) said second chamber is in fluid communication with each of the other two upper chambers.

6. An apparatus as set forth in claim 4, wherein:
(a) two of said three lower chambers are wash water only chambers in that said wash water only chambers are configured to receive a washing liquid but not a washing gas from a washing fluid supply source during washing of a filter bed with simultaneous liquid and gas and a third lower chamber is a wash gas only chamber in that said wash gas chamber is configured to receive a washing gas but not a washing liquid from a washing fluid supply source during washing of a filter bed with simultaneous liquid and gas.

7. An apparatus for use in a filter system for filtering water or wastewater, said apparatus comprising:
(a) an underdrain lateral, said underdrain lateral having at least a first chamber, a second chamber and a third chamber;
(b) said first chamber being a washing gas only chamber as said first chamber receives a washing gas but not a washing liquid from a washing fluid supply source during washing of a filter bed using simultaneous liquid and gas;
(c) said second chamber being in fluid communication with said first chamber such that a washing gas introduced into said first chamber passes into said second chamber, said second chamber being disposed above an uppermost portion of said first chamber, said second chamber including an upper wall and an orifice in the upper wall for directing a washing gas into the filter bed; and
(d) said third chamber having at least one orifice for permitting a washing liquid and a washing gas to pass from said third chamber into the filter bed, said third chamber further being configured to simultaneously direct a washing liquid and a washing gas into the filter bed during washing of the filter bed using simultaneous liquid and gas, said underdrain lateral further including an inner wall, an orifice being formed in said inner wall to permit a gas to pass from said second chamber into said third chamber, said orifice being disposed between an upper surface and a lower surface of said second chamber, said inner wall having an orientation other than horizontal.

8. An apparatus for use in a filter system for filtering water or wastewater, said apparatus comprising:
(a) an underdrain lateral, said underdrain lateral having at least a first chamber, a second chamber, a third chamber, and a fourth chamber, said underdrain lateral further including a first inner wall, an orifice being formed in said first inner wall to permit a gas to pass from said second chamber into said third chamber, said orifice being disposed between an upper surface and a lower surface of said second chamber, said first inner wall having an orientation other than horizontal;
(b) said first chamber being a washing gas only chamber as said first chamber receives a washing gas but not a washing liquid from a washing fluid supply source during washing of a filter bed using simultaneous liquid and gas;
(c) said second chamber being in fluid communication with said first chamber such that a washing gas introduced into said first chamber passes into said second chamber, said second chamber including an upper wall and an orifice in the upper wall for directing a washing gas into the filter bed;
(d) said third chamber having at least one orifice for permitting a washing liquid and a washing gas to pass from said third chamber into the filter bed, said third chamber further being configured to simultaneously direct a washing liquid and a washing gas into the filter bed during washing of the filter bed using simultaneous liquid and gas; and,
(e) said underdrain lateral further including a second inner wall, an orifice being formed in said second inner wall to permit a gas to pass from said second chamber into said fourth chamber, said orifice being disposed between an upper surface and a lower surface of said second chamber, said second inner wall having an orientation other than horizontal, said fourth chamber having at least one opening for permitting a washing liquid and a washing gas to pass from said fourth chamber into the filter bed, said fourth chamber further being configured to simultaneously direct a washing liquid and a washing gas into the filter bed during washing of the filter bed using simultaneous liquid and gas.

9. An apparatus as set forth in claim 8, wherein:
(a) said first chamber is larger than said second chamber.

10. An apparatus as set forth in claim 8, wherein:
(a) said underdrain lateral includes means for securing a porous plate to said underdrain lateral.

11. An apparatus as set forth in claim 8, wherein said second chamber is disposed above said first chamber.

12. An apparatus as set forth in claim 8, wherein:
(a) said underdrain lateral is extruded as a single piece and of sufficient length to extend substantially the length of the filter bed.

13. An apparatus for use in a filter system for filtering water or wastewater, said apparatus comprising:
(a) an underdrain lateral, said underdrain lateral having three upper chambers and three lower chambers;
(b) two of said three upper chambers are configured to simultaneously direct a liquid and a gas into a filter bed during a first washing procedure including simultaneous use of a liquid and gas to clean the filter bed while the other of said three upper chambers is configured to direct only a washing gas to the filter bed during the first washing procedure, said three upper chambers are configured such that a washing gas from a washing fluid source directed into one of said three upper chambers may pass into each of the other two upper chambers prior to the gas passing above an upper surface of said one of said three upper chambers; and,
(c) two of said three lower chambers are washing liquid only chambers as each of these chambers receives a washing liquid but not a washing gas from a fluid supply source during the first washing procedure while the other of the three lower chambers is a washing gas only chamber as this chamber receives a washing gas but not a washing liquid from a washing fluid supply source during the first washing procedure.

14. An apparatus for use in a filter system for filtering water or wastewater, said apparatus comprising:
(a) an underdrain lateral, said underdrain lateral having at least a first chamber, a second chamber, a third chamber and a fourth chamber;
(b) said first chamber being a washing gas chamber as said first chamber receives a washing gas from a washing fluid supply source during washing of a filter bed;
(c) said second chamber being in fluid communication with said first chamber such that a washing gas introduced into said first chamber passes into said second chamber, said second chamber including an upper wall and an orifice in the upper wall for directing a washing gas into the filter bed; and
(d) said third chamber and said fourth chamber being in fluid communication with said second chamber such that a gas may pass from said second chamber into said third chamber and said fourth chamber without the gas passing above an uppermost surface of said second chamber, each of said third chamber and said fourth chamber having at least one opening for permitting a washing gas to pass from the corresponding chamber into the filter bed during washing of the filter bed.

15. An apparatus for use in a filter system for filtering water or wastewater, said apparatus comprising:
(a) an underdrain lateral, said underdrain lateral having at least a first chamber, a second chamber and a third chamber, said third chamber being disposed below a lowermost portion of said first chamber and said second chamber, a vertical wall disposed adjacently between said first and second chambers, and an air distribution orifice disposed in said vertical wall for directing air from said second chamber into said first chamber;
(b) said first chamber being configured to simultaneously direct a liquid and a gas into a filter bed during a first washing procedure including simultaneous use of a liquid and gas to clean the filter bed; and,
(c) said second chamber being configured to direct only a gas into a filter bed during the first washing procedure while said first chamber is simultaneously directing a liquid and a gas into a filter bed during the first washing procedure.

16. An apparatus for use in a filter system for filtering water or wastewater, said apparatus comprising:
(a) an underdrain lateral, said underdrain lateral having at least a first chamber and a second chamber, a vertical wall disposed adjacently between said first and second chambers, and an air distribution orifice disposed in said vertical wall for directing air from said second chamber into said first chamber;
(b) said first chamber being configured to simultaneously direct a liquid and a gas into a filter bed during a first washing procedure including simultaneous use of a liquid and gas to clean the filter bed; and,
(c) said second chamber being configured to direct only a gas into a filter bed during the first washing procedure while said first chamber is simultaneously directing a liquid and a gas into a filter bed during the first washing procedure;
(d) said underdrain lateral includes three upper chambers and three lower chambers, said first chamber and said second chamber form two of said three upper chambers, a third upper chamber is configured to direct a washing liquid and a washing gas into the filter bed during a first washing procedure including simultaneous use of a liquid and gas to clean the filter bed.

17. An apparatus for use in a filter system for filtering water or wastewater, said apparatus comprising:
(a) an underdrain lateral, said underdrain lateral having at least a first chamber, a second chamber and a third chamber;
(b) said first chamber being a washing gas only chamber as said first chamber receives a washing gas but not a washing liquid from a washing fluid supply source during washing of a filter bed using simultaneous liquid and gas;
(c) said second chamber being in fluid communication with said first chamber such that a washing gas introduced into said first chamber passes into said second chamber, said second chamber being disposed above an uppermost portion of said first chamber, said second chamber including an upper wall and an orifice in the upper wall for directing a washing gas into the filter bed; and
(d) said third chamber having at least one opening for permitting a washing liquid and a washing gas to pass from said third chamber into the filter bed, a vertical wall disposed adjacently between said second chamber and said third chamber, and an air distribution orifice disposed in said vertical wall for directing air from said second chamber into said third chamber, said third chamber further being configured to simultaneously direct a washing liquid and a washing gas into the filter bed during washing of the filter bed using simultaneous liquid and gas.

18. An apparatus for use in a filter system for filtering water or wastewater, said apparatus comprising: (a) an underdrain lateral, said underdrain lateral having at least a first chamber, a second chamber, a third chamber and a fourth chamber;
(b) said first chamber being a washing gas chamber as said first chamber receives a washing gas from a washing fluid supply source during washing of a filter bed;
(c) said second chamber being in fluid communication with said first chamber such that a washing gas introduced into said first chamber passes into said second chamber, said second chamber including an upper wall and an orifice in the upper wall for directing a washing gas into the filter bed; and
(d) said third chamber and said fourth chamber being in fluid communication with said second chamber, each of said third chamber and said fourth chamber having at least one opening for permitting a washing gas to pass from the corresponding chamber into the filter bed during washing of the filter bed, a pair of vertical walls defining sides of the second chamber, one of said vertical walls being disposed adjacently between the second and third chambers, and the other vertical wall being disposed adjacently between the second and fourth chambers, and air distribution orifices in each of said pair of vertical walls for directing air from the second chamber to the third and fourth chambers.

* * * * *